US012340639B2

(12) United States Patent
Kim et al.

(10) Patent No.: US 12,340,639 B2
(45) Date of Patent: Jun. 24, 2025

(54) AUTONOMOUS DRIVING RECORDER AND OPERATION METHOD THEREOF

(71) Applicants: HYUNDAI MOTOR COMPANY, Seoul (KR); Kia Corporation, Seoul (KR); HYUNDAI AUTOEVER Corp., Seoul (KR)

(72) Inventors: Byung Guk Kim, Seongnam-si (KR); Ho Choul Jung, Seongnam-si (KR); Kyu Baek Jung, Hanam-si (KR); Sung Mo Dong, Seoul (KR); Sang Hoon Lee, Cheonan-si (KR); Jong Yoon Yee, Seoul (KR)

(73) Assignees: HYUNDAI MOTOR COMPANY, Seoul (KR); KIA CORPORATION, Seoul (KR); HYUNDAI AUTOEVER CORP., Seoul (KR)

( * ) Notice: Subject to any disclaimer, the term of this patent is extended or adjusted under 35 U.S.C. 154(b) by 781 days.

(21) Appl. No.: 17/389,817

(22) Filed: Jul. 30, 2021

(65) Prior Publication Data
US 2022/0207930 A1 Jun. 30, 2022

(51) Int. Cl.
*G07C 5/00* (2006.01)
*G07C 5/08* (2006.01)
*H04L 9/08* (2006.01)
*H04L 9/32* (2006.01)

(52) U.S. Cl.
CPC ............ *G07C 5/085* (2013.01); *H04L 9/0894* (2013.01); *H04L 9/3242* (2013.01)

(58) Field of Classification Search
CPC ..... H04L 2209/84; H04L 9/3239; H04L 9/50; H04L 9/3247; H04L 63/0428; H04L 67/12; H04L 9/0637; H04L 63/0823; H04L 63/123; H04L 9/0643; H04L 9/0894; H04L 9/3242; H04L 12/40; H04L 12/403; H04L 2012/40215; H04L 2012/40273; H04L 2209/42; H04L 41/142; H04L 41/16; H04L 43/0817; H04L 43/0876; H04L 63/04; H04L 63/0407; H04L 63/0414; H04L 63/0421; H04L 63/10; H04L 63/12; H04L 63/1408; H04L 67/104; H04L 67/1042; H04L 67/535; H04L 9/0861; H04L 9/0869; H04L 9/3231; H04L 9/3263; H04L 9/3278; H04L 9/3297
See application file for complete search history.

(56) References Cited

U.S. PATENT DOCUMENTS 11,410,475 B2 * 8/2022 Golov ................. B60R 21/0136
2009/0318121 A1 * 12/2009 Marumoto ............. G07C 5/085
455/414.1
2014/0301550 A1 * 10/2014 Lewis ................... H04L 9/0822
380/259

(Continued)

*Primary Examiner* — Truc M Do
(74) *Attorney, Agent, or Firm* — MORGAN, LEWIS & BOCKIUS LLP

(57) ABSTRACT

An autonomous driving recorder and an operation method thereof, may include a storage including a secure world, an authenticator that stores an authentication key, and a data logger that writes information related to a running state of a vehicle during autonomous driving. The data logger accesses the secure world using the authentication key and writes data associated with a trigger signal among the information related to the running state in the secure world.

12 Claims, 9 Drawing Sheets

(56) References Cited

U.S. PATENT DOCUMENTS

| | | | | |
|---|---|---|---|---|
| 2018/0007323 A1* | 1/2018 | Botusescu | ............ | H04N 5/765 |
| 2019/0140850 A1* | 5/2019 | Ambrosin | ............ | H04W 12/06 |
| 2019/0236031 A1* | 8/2019 | Kim | ............ | G06F 21/78 |
| 2019/0287319 A1* | 9/2019 | Golov | ............ | G06F 11/0751 |
| 2019/0302766 A1* | 10/2019 | Mondello | ............ | H04L 9/3247 |

* cited by examiner

400

| Key / (MAC) | Data | Nonce | Write Counter | Address | ... |
|---|---|---|---|---|---|
| 32 Byte (256 bits) | 256 Byte | 16 Byte | 4 Byte | 2 Byte | ... |

Fig.3

AUTONOMOUS DRIVING RECORDER AND OPERATION METHOD THEREOF

CROSS-REFERENCE TO RELATED APPLICATION

The present application claims priority to Korean Patent Application No. 10-2020-0186222, filed on Dec. 29, 2020, the entire contents of which is incorporated herein for all purposes by this reference.

BACKGROUND OF THE INVENTION

Field of the Invention

The present invention relates to an autonomous driving recorder and an operation method thereof.

Description of Related Art

An autonomous vehicle refers to a vehicle capable of recognizing driving environments without manipulation of its driver to determine a risk and planning a driving route to drive itself. Such an autonomous vehicle is loaded with a data logger which writes vehicle running states or the like while traveling in an autonomous driving mode. Data written by the data logger is used to verify the responsibility for the occurrence of an accident, when the vehicle accident occurs. Thus, fabrication such as random deletion for the data written by the data logger should be prevented to block unauthenticated access.

The information disclosed in this Background of the Invention section is only for enhancement of understanding of the general background of the invention and may not be taken as an acknowledgement or any form of suggestion that this information forms the prior art already known to a person skilled in the art.

BRIEF SUMMARY

Various aspects of the present invention are directed to providing an autonomous driving recorder for securely storing information related to a running state of a vehicle during autonomous driving and an operation method thereof.

The technical problems to be solved by the present inventive concept are not limited to the aforementioned problems, and any other technical problems not mentioned herein will be clearly understood from the following description by those skilled in the art to which various exemplary embodiments of the present invention pertains.

According to various aspects of the present invention, an autonomous driving recorder may include a storage including a secure world, an authenticator that stores an authentication key, and a data logger that writes information related to a running state of a vehicle during autonomous driving. The data logger may access the secure world using the authentication key and may write data associated with a trigger signal among the information related to the running state in the secure world.

The storage may be a non-volatile memory.

The trigger signal may be a signal indicating at least one of autonomous driving system activation, autonomous driving system deactivation, a transition demand (TD) by a system, an emergency maneuver, an event data recorder (EDR) trigger, collision start and end, a minimum risk maneuver (MRM) by the system, a system failure, or a vehicle breakdown.

The data logger may generate a read request packet when detecting a read request, may generate a random number and adds the random number to the read request packet, and may transmit a read request message including the read request packet to the storage.

The storage may check validity of an address included in the received read request message, when receiving the read request message, may generate a first message authentication code (MAC) for an authentication key stored in the secure world and the read request packet included in the received read request message, and may generate a response message including the first MAC, a copy of the random number, data matched to the address and transmits the response message to the data logger.

The data logger may generate a second MAC for the authentication key stored in the authenticator and a read request packet included in the received response message, when receiving the response message, may compare the first MAC with the second MAC and concludes that authentication of the received response message succeeds, when the first and second MACs are identical to each other, and may read the data included in the response message.

The data logger may generate a write request packet including data associated with the trigger signal, when receiving the trigger signal, may read a write count stored in a counter in the secure world and adds the write count to the write request packet, may generate a third MAC for the authentication key stored in the authenticator and the write request packet, and may generate a write request message including the third MAC and the read request packet and may transmit the write request message to the storage.

The storage may receive the write request message, may generate a fourth MAC for an authentication key stored in the secure world and the write request packet included in the received write request message, and may compare the third MAC with the fourth MAC and may determine that authentication of the received write request message succeeds, upon determining that the third and fourth MACs are identical to each other.

The storage may compare a write count included in the received write request message with the write count read from the counter and may determine that authentication of the received write request message succeeds, when the two write counts are identical to each other.

The storage may write the data associated with the trigger signal in the secure world, upon determining that the authentication of the received write request message succeeds.

The storage may discard the received write request message, when the authentication of the received write request message fails.

According to various aspects of the present invention, an operation method of an autonomous driving recorder for writing information related to a running state of a vehicle during autonomous driving may include requesting, by a data logger, to access a secure world in a storage and accessing, by the data logger, the secure world using an authentication key stored in an authenticator and writing, by the data logger, data associated with a trigger signal among the information related to the running state in the secure world.

The requesting to access the secure world may include generating, by the data logger, a read request packet, when detecting a read request, generating, by the data logger, a random number and adding, by the data logger, the random number to the read request packet, and transmitting, by the data logger, a read request message including the read request packet to the storage.

The operation method may further include checking, by the storage including a controller, validity of an address included in the received read request message, when receiving the read request message, generating, by the storage, a first MAC for an authentication key stored in the secure world and the read request packet included in the received read request message, and generating, by the storage, a response message including the first MAC, a copy of the random number, data matched to the address and transmitting, by the storage, the response message to the data logger.

The operation method may further include generating, by the data logger, a second MAC for the authentication key stored in the authenticator and a read request packet included in the received response message, when receiving the response message, comparing, by the data logger, the first MAC with the second MAC and concluding, by the data logger, that authentication of the received response message succeeds, when the first and second MACs are identical to each other, and reading, by the data logger, the data included in the response message.

The requesting to access the secure world may include generating, by the data logger, a write request packet including the data associated with the trigger signal, when receiving the trigger signal, reading, by the data logger, a write count stored in a counter in the secure world and adding, by the data logger, the write count to the write request packet, generating, by the data logger, a third MAC for the authentication key stored in the authenticator and the write request packet, and generating, by the data logger, a write request message including the third MAC and the write request packet and transmitting, by the data logger, the write request message to the storage.

The writing of the data associated with the trigger signal may include receiving, by the trigger, the write request message, generating, by the storage, a fourth MAC for an authentication key stored in the secure world and the write request packet included in the received write request message, and comparing, by the storage, the third MAC with the fourth MAC and concluding, by the storage, that authentication of the received write request message succeeds, upon determining that the third and fourth MACs are identical to each other.

The writing of the data associated with the trigger signal may further include comparing, by the storage, a write count included in the received write request message with the write count read from the counter and concluding, by the storage, that authentication of the received write request message succeeds, upon determining that the write count included in the received write request message and the write count read from the counter are identical to each other.

The writing of the data associated with the trigger signal may further include writing, by the storage, the data associated with the trigger signal in the secure world, upon determining that the authentication of the received write request message succeeds.

The writing of the data associated with the trigger signal may further include discarding, by the storage, the received write request message, upon determining that the authentication of the received write request message fails.

The methods and apparatuses of the present invention have other features and advantages which will be apparent from or are set forth in more detail in the accompanying drawings, which are incorporated herein, and the following Detailed Description, which together serve to explain certain principles of the present invention.

BRIEF DESCRIPTION OF THE DRAWINGS

FIG. 3 is a drawing illustrating a data frame structure according to exemplary embodiments of the present invention;

Figure 1:
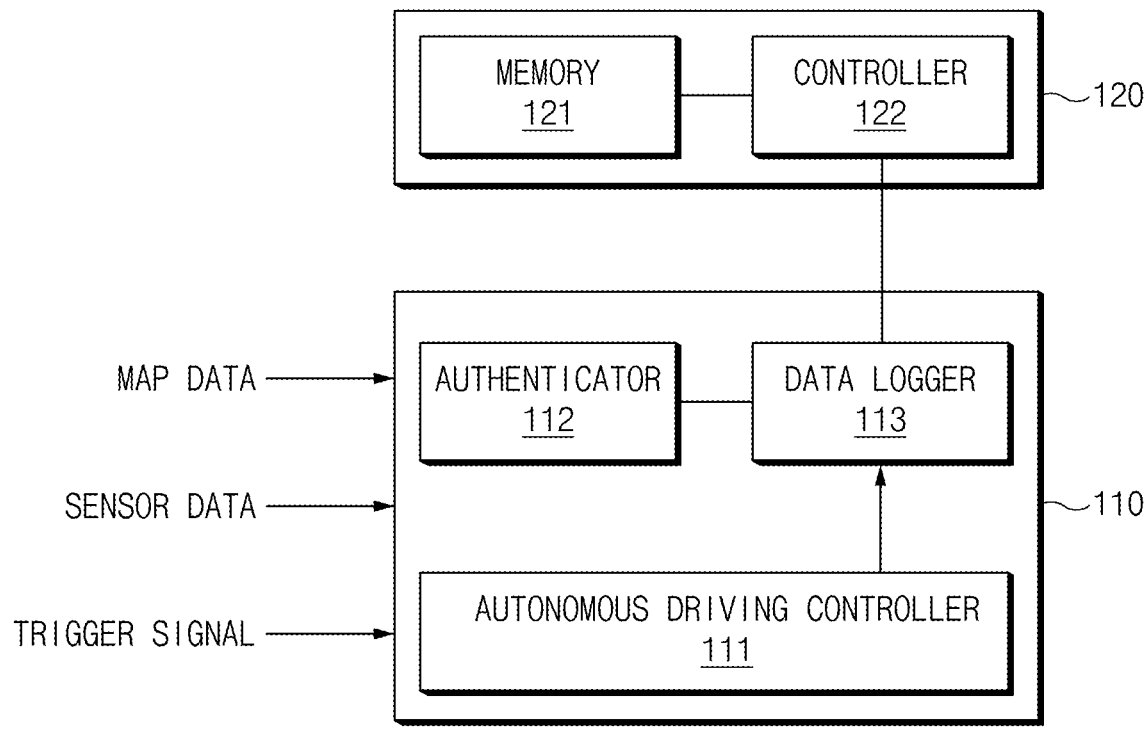
FIG. 1 is a block diagram illustrating a configuration of an autonomous driving recorder according to exemplary embodiments of the present invention.

It may be understood that the appended drawings are not necessarily to scale, presenting a somewhat simplified representation of various features illustrative of the basic principles of the present invention. The specific design features of the present invention as disclosed herein, including, for example, specific dimensions, orientations, locations, and shapes will be determined in part by the particularly intended application and use environment.

In the figures, reference numbers refer to the same or equivalent portions of the present invention throughout the several figures of the drawing.

DETAILED DESCRIPTION

Reference will now be made in detail to various embodiments of the present invention(s), examples of which are illustrated in the accompanying drawings and described below. While the present invention(s) will be described in conjunction with exemplary embodiments of the present invention, it will be understood that the present description is not intended to limit the present invention(s) to those exemplary embodiments. On the other hand, the present invention(s) is/are intended to cover not only the exemplary embodiments of the present invention, but also various alternatives, modifications, equivalents and other embodiments, which may be included within the spirit and scope of the present invention as defined by the appended claims.

Hereinafter, various exemplary embodiments of the present invention will be described in detail with reference to the exemplary drawings. In adding the reference numerals to the components of each drawing, it should be noted that the identical or equivalent component is designated by the identical numeral even when they are displayed on other drawings. Furthermore, in describing the exemplary embodiment of the present invention, a detailed description of well-known features or functions will be ruled out in order not to unnecessarily obscure the gist of the present invention.

In describing the components of the exemplary embodiment according to various exemplary embodiments of the present invention, terms such as first, second, "A", "B", (a), (b), and the like may be used. These terms are merely intended to distinguish one component from another component, and the terms do not limit the nature, sequence or order of the constituent components. Unless otherwise defined, all terms used herein, including technical or scientific terms, have the same meanings as those generally understood by those skilled in the art to which various exemplary embodiments of the present invention pertains. Such terms as those defined in a generally used dictionary are to be interpreted as having meanings equal to the contextual meanings in the relevant field of art, and are not to be interpreted as having ideal or excessively formal meanings unless clearly defined as having such in the present application.

FIG. 1 is a block diagram illustrating a configuration of an autonomous driving recorder according to exemplary embodiments of the present invention.

An autonomous driving recorder 100 may be mounted a vehicle loaded with an autonomous driving system. The autonomous driving recorder 100 may automatically record a running state of the vehicle, for example, a vehicle speed, an engine revolutions per minute (RPM), a brake operation state, a vehicle position, a driving distance, a traffic accident situation, and/or the like in a storage medium.

Referring to FIG. 1, the autonomous driving recorder 100 may include a processor 110 and a storage 120.

The processor 110 may control the overall operation of the autonomous driving recorder 100, which may be implemented as a central processing unit (CPU), a microcontroller unit (MCU), microprocessors, a digital signal processor (DSP), and/or the like. It is shown that the processor 110 is implemented as one processor in the drawing, but not limited thereto. For example, the processor 110 may be implemented as two or more processors, for example, a CPU and an MCU.

The processor 110 may receive vehicle data (sensor data) and/or a trigger signal from vehicle sensors, electronic control units (ECU), and/or the like. The vehicle sensors may include a steering angle sensor, a wheel speed sensor, a brake pedal position sensor, a global positioning system (GPS), an acceleration sensor, an ultrasonic sensor, a camera, a radar, a light detection and ranging (LiDAR), an inertial measurement unit (IMU), and/or the like. The ECU may be an airbag control unit (ACU), a body control module (BCM), an electronic stability control (ESC), a traction control system (TCS), an antilock brake system (ABS), or the like. The vehicle data may be information such as a vehicle speed, an engine RPM, a vehicle position, input signal data, an impact, or a communication state. The trigger signal may be a signal indicating autonomous driving system activation, autonomous driving system deactivation, a transition demand (TD) by the system, an emergency maneuver, an event data recorder (EDR) trigger, collision start and end, a minimum risk maneuver (MRM) by the system, a serious system failure, a serious vehicle breakdown, and/or the like.

The processor 110 may include an autonomous driving controller 111, an authenticator 112, a data logger 113, and the like. In an exemplary embodiment of the present invention, the autonomous driving controller 111, the authenticator 112, and the data logger 113 may be implemented as a software module. The software module may be stored in a memory and may be executed by the processor 110.

The autonomous driving controller 111 may control autonomous driving of the vehicle. The autonomous driving controller 111 may receive sensor data, map data, and/or a trigger signal from the outside of the autonomous driving recorder 100. When the trigger is received, the autonomous driving controller 111 may deliver the trigger signal to the data logger 113. Furthermore, the autonomous driving controller 111 may control autonomous driving of the vehicle based on the sensor data and/or the map data.

The authenticator 112 may generate a message authentication code (MAC), that is, a hash value, to store data in the storage 120. The authenticator 112 may determine the MAC (i.e., the hash value) using a hash-based message authentication code (HMAC) secure hash algorithm-256 (SHA-256) algorithm. The authenticator 112 may include an authentication key. The authentication key may be initially stored once in an environment, such as a factory, in which security is ensured. The exemplary embodiment of the present invention is exemplified as the authenticator 112 is implemented independently, but not limited thereto. For example, when providing a safe security feature configured for performing acceleration processing, for example, an Intel hardware security module (HSM) or the like, the processor 110 may directly perform the function of the authenticator 112.

The data logger 113 may record (store) information related to a running state of the vehicle in an internal memory during autonomous driving. Herein, the information related to the running state may include vehicle data detected by vehicle sensors, data for a trigger signal generation event, and/or the like. The internal memory may be implemented as a readable and writable memory such as a random access memory (RAM). Furthermore, the data logger 113 may store autonomous driving information and state information (e.g., driver information, sensor information, or the like).

The data logger 113 may include a driver for accessing a secure world of the storage 120. When receiving the trigger signal from the autonomous driving controller 111, the data logger 113 may record data for a generation event when the trigger signal is generated, that is, a signal, a time, and the like of the event in the storage 120. The data logger 113 may generate a data frame for reading data stored in the storage 120 or writing data in the storage 120. A countermeasure for preventing forgery and falsification of a message may be included in the data frame. The data logger 113 may access (i.e., read and write) the storage 120 through an authentication procedure.

The data logger 113 may store specified data (e.g., vehicle data or map data) in the storage 120 during a predetermined time period before and after the trigger is generated when the trigger signal is generated. The data logger 113 may store data for a trigger signal generation event in the internal memory, when the trigger signal is generated, and may simultaneously store the data in the storage 120. Furthermore, the data logger 113 may store the data for the generation event in the internal memory, when the trigger signal is generated, and may store a copy of the data in the storage 120, when the vehicle stops or parks. After the event of generating the trigger signal occurs, when the vehicle stops or parks and when the vehicle is traveling, the data logger 113 may copy data for the event to store the data in the storage 120.

The storage 120 may be a non-volatile memory (NVM), which may be an embedded multi media card (eMMC) memory, a flash memory, a hard disk, a solid state disk, a read only memory (ROM), a programmable ROM (PROM), an erasable and programmable ROM (EPROM), an electrically erasable and programmable ROM (EEPROM), a ferroelectric random access memory (FRAM), a magnetoresistive RAM (MRAM), a ferroelectric field effect transistor (FeFET) memory, and/or the like.

The storage 120 may include a memory 121 and a controller 122. It is shown in the drawing that the storage 120 includes the one memory 121, but not limited thereto. For example, the storage 120 may include two or more memories.

The memory 121 may be a storage space in the storage 120. The memory 121 may store information related to a running state of the vehicle, user data, logic of performing a predetermined function, and/or the like. The memory 121 may store instructions executed by the controller 122.

At least a portion of the memory 121 may be specified as a secure world. In other words, the storage 120 may allocate at least a portion of the entire storage space to a secure world. An authentication key and a write count may be stored in the secure world. Data (information) associated with the trigger signal among the information related to the running state of the vehicle may be stored in the secure world.

The controller 122 may perform authentication when there is a data access request from the processor 110. When there is a read access request or a write access request, the controller 122 may perform an authentication procedure using the HMAC SHA-256 algorithm. The controller 122 may approve or deny the access request of the processor 110 depending on the authenticated result.

When receiving a read request message from the processor 110, the controller 122 may generate a MAC for the read request message by the HMAC SHA-256 algorithm. The controller 122 may configure a response message including the generated MAC to transmit the response message.

The controller 122 may respond to the write count depending on a counter read request of the processor 110. Thereafter, when receiving a write request message from the processor 110, the controller 122 may authenticate the received write request message by the HMAC SHA-256 algorithm. The controller 122 may determine a MAC for the authentication key stored in the secure world and a data packet included in the write request message using the HMAC SHA-256 algorithm. The controller 122 may compare the determined MAC with the MAC included in the write request message to perform verification. The controller 122 may determine that the authentication succeeds, when the two MACs are identical to each other, and may determine that the authentication fails, when the two MACs are not identical to each other.

The controller 122 may include at least one of an application specific integrated circuit (ASIC), a digital signal processor (DSP), programmable logic devices (PLD), field programmable gate arrays (FPGAs), a central processing unit (CPU), microcontrollers, or microprocessors.

Figure 2A:
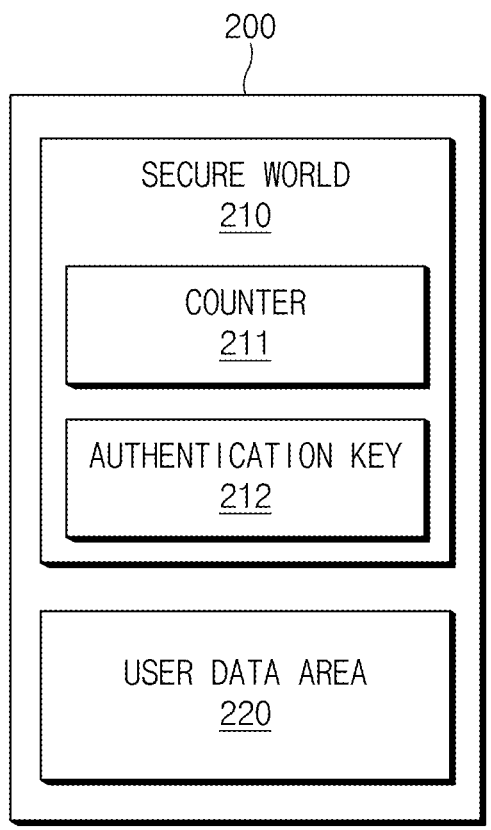
FIG. 2A is a drawing illustrating a storage space structure of a storage according to various exemplary embodiments of the present invention.
Figure 2B:
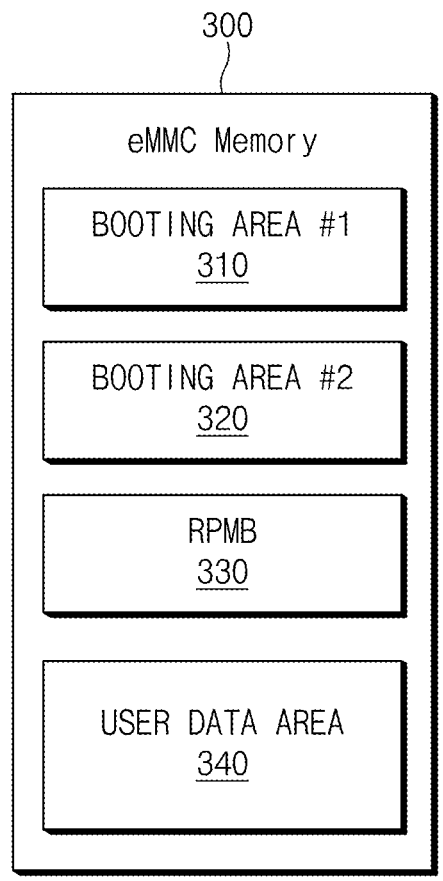
FIG. 2B is a drawing illustrating a storage space structure of a storage according to various exemplary embodiments of the present invention.

FIG. 2A is a drawing illustrating a storage space structure of a storage according to various exemplary embodiments of the present invention. FIG. 2B is a drawing illustrating a storage space structure of a storage according to various exemplary embodiments of the present invention.

Referring to FIG. 2A, the entire storage space 200 of a storage 120 of FIG. 2 may be divided into a secure world 210 accessible through an authentication procedure and a user data area 220 accessible without an authentication procedure.

The secure world 210 may include a counter 211 and an authentication key 212. The counter 211 may be a counter which increases only when authentication of a write request of the processor 110 succeeds. In other words, the counter 211 may be a monotonic counter having one directionality, which facilitates increasing and precludes decreasing. The authentication key 212 may be the same as an authentication key stored in an authenticator 112 of FIG. 1, which may be initially stored once in an environment, such as a factory, in which security is ensured. Information related to a running state of the vehicle may be stored in the secure world 210.

The user data area 220 may store data generated according to an operation of a controller 122 of FIG. 1. Furthermore, the user data area 220 may store user data, specific logic, and the like.

The above-mentioned embodiment is exemplified as the secure world 210 is allocated in the storage 120, but not limited thereto. For example, a secure space allocated to an external memory may be used as the secure world 210. For example, referring to FIG. 2B, an eMMC memory 300 may include booting areas 310 and 320 which store a booting program or environment configuration values associated with booting, a replay protection memory block (RPMB) 330 which stores playback protection data (i.e., data needing security), and a user data area 340. Thus, the RPMB 330 of the eMMC memory 300 located outside the storage 120 may be used as the secure world 210.

FIG. 3 is a drawing illustrating a data frame structure according to exemplary embodiments of the present invention.

As shown in FIG. 3, a data frame 400 of a message transmitted and received between a processor 110 and a storage 120 of FIG. 1 may include a key field 410, a data field 420, a nonce field 430, a counter field 440, an address field 450, and the like.

A MAC may be stored (inserted) in (into) the key field 410.

Data to be read or written by accessing a secure world 210 of FIG. 2A may be stored in the data field 420.

A random number generated when there is a read request for data stored in the secure world 210 may be inserted into the nonce field 430.

A value stored in a counter 211 in the secure world 210 may be inserted into the counter field 440. In other words, a write count read from the counter 211 may be written in the counter field 440.

An address indicating a position of an authentication key and/or data in the secure world 210 may be stored in the address field 450. In other words, an access address may be inserted into the address field 450.

The data field 420, the nonce field 430, the counter field 440, and the address field 450 may be collectively referred to as a data packet.

Figure 4A:
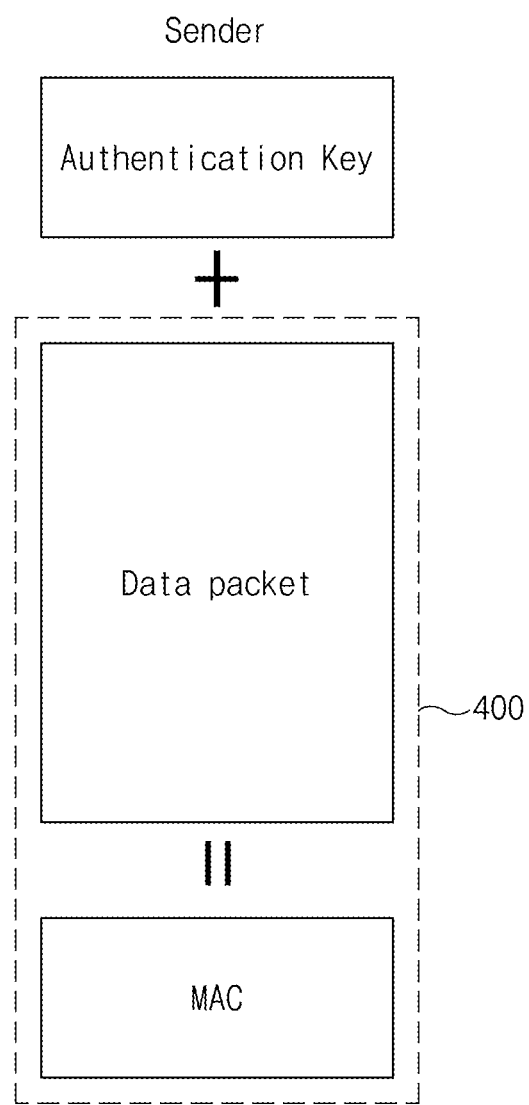
FIG. 4A and FIG. 4B are drawings illustrating a message authentication process according to exemplary embodiments of the present invention.
Figure 4B:
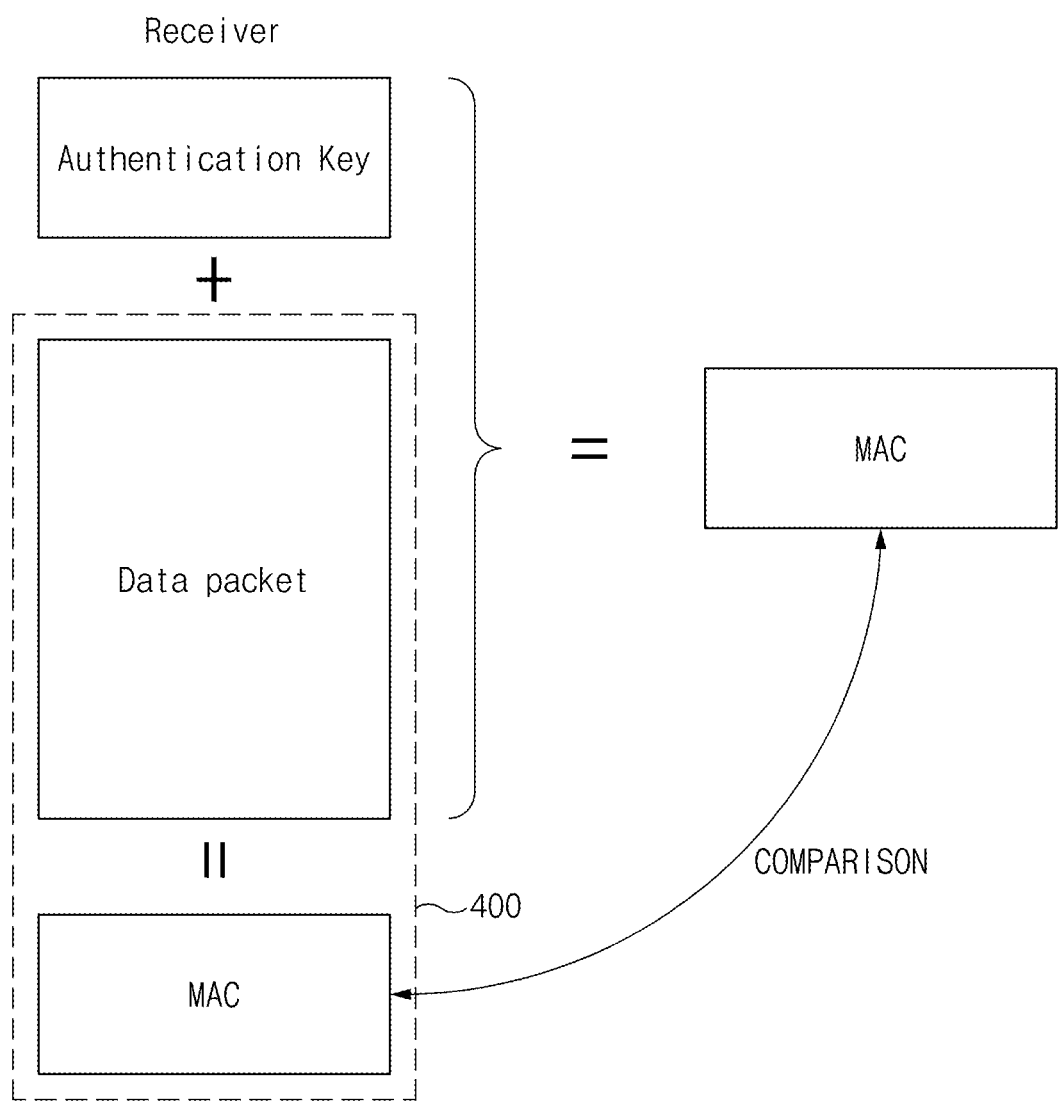

FIG. 4A and FIG. 4B are drawings illustrating a message authentication process according to exemplary embodiments of the present invention.

Referring to FIG. 4A, a sender which transmits a message may determine a MAC for an authentication key and a data packet using an HMAC SHA-256 algorithm. Herein, the authentication key may be shared in the sender and a receiver. The sender may form a data frame (message) 400 using the data packet and the determined MAC and may transmit the data frame 400 to the receiver.

The receiver may determine a MAC for an authentication key and a data packet in the received data frame 400 using the HMAC SHA-256 algorithm. The receiver may compare the determined MAC with a MAC in the received data frame 400. The receiver may determine that the authentication succeeds, when the determined MAC is identical to the received MAC, and may determine that the authentication fails, when the determined MAC is not identical to the received MAC.

Hereinafter, a description will be provided of an operation method of an autonomous driving recorder with reference to FIG. 5 and FIG. 6.

Figure 5:
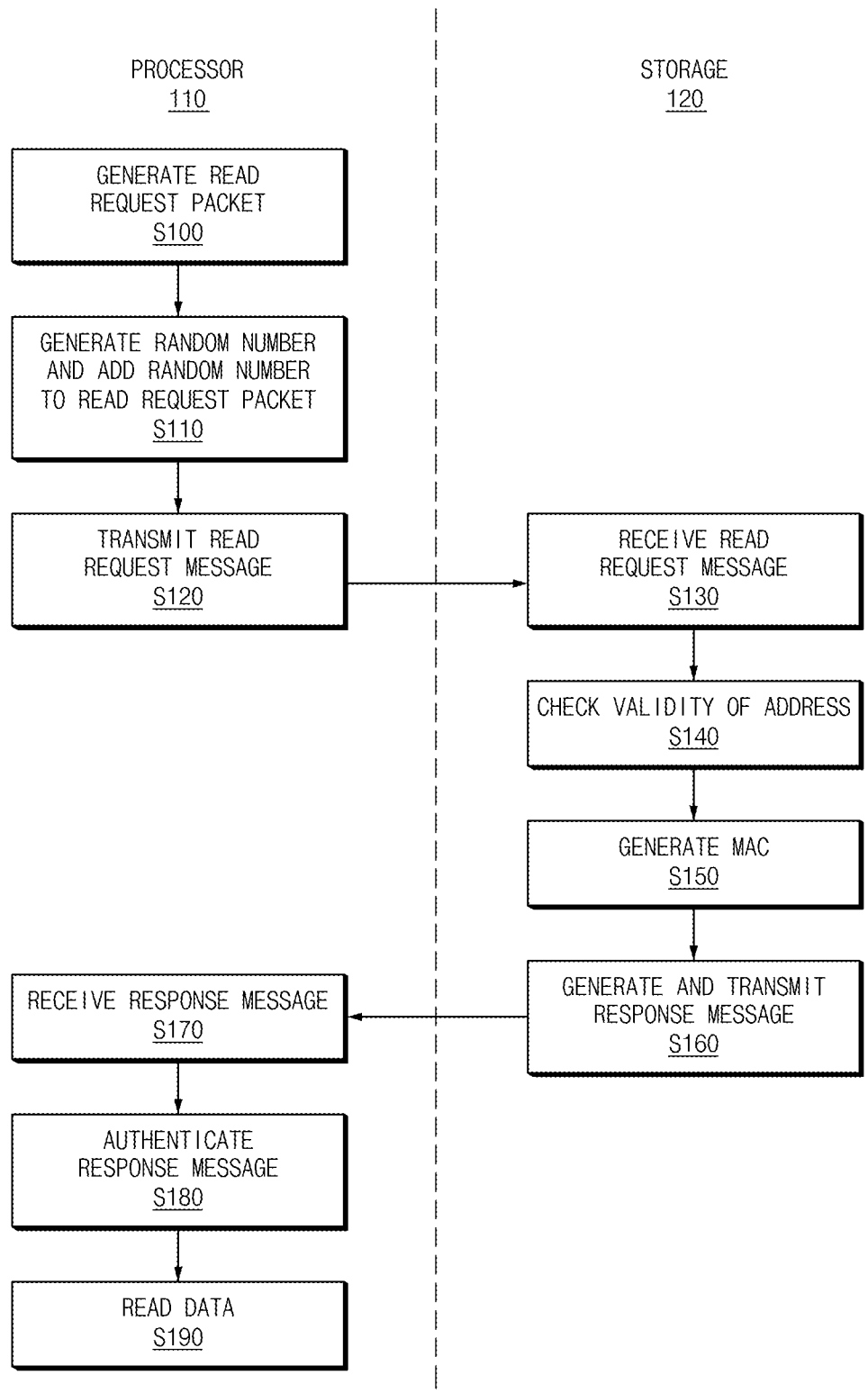
FIG. 5 is a signal sequence diagram illustrating a data read method of an autonomous driving recorder according to exemplary embodiments of the present invention.

FIG. 5 is a signal sequence diagram illustrating a data read method of an autonomous driving recorder according to exemplary embodiments of the present invention.

In S100, a processor 110 of FIG. 1 may generate a read request packet, when detecting a data read request. When receiving a signal (a trigger signal) instructing to read data, a data logger 113 of FIG. 1 may generate a read request packet (a data packet).

When generating the read request packet, in S110, the processor 110 may generate a random number and may add the random number to the read request packet. The data logger 113 may generate a random number of 16 bytes and may insert the generated random number into a nonce field 430 of the read request packet.

In S120, the processor 110 may transmit a read request message including the read request packet to a storage 120 of FIG. 1. The data logger 113 may transmit a data frame (message) including the read request packet, that is, a data packet, and a key field to the storage 120.

In S130, the storage 120 may receive the read request message transmitted from the processor 110.

In S140, the storage 120 may check validity of an address included in the read request message. A controller 122 of the storage 120 may determine whether an address stored in an address field of the read request packet is valid.

In S150, the storage 120 may generate (determine) a MAC (a first MAC) based on a previously stored authentication key and the read request packet included in the read request message. The controller 122 of the storage 120 may determine a hash value, that is, a MAC, for an authentication key stored in a secure world 210 of FIG. 2A and the received read request packet using an HMAC SHA-256 algorithm.

In S160, the storage 120 may generate a response message based on the generated MAC and may transmit the generated response message to the processor 110. The response message may include a response type, a block count, a random number copy inserted into a nonce field 430 of the read request packet, a data address (an access address), and the MAC. The response message may include data read from the secure world 210 mapped to the address (the data address).

In S170, the processor 110 may receive the response message transmitted from the storage 120.

In S180, the processor 110 may authenticate the response message. An authenticator 112 of the processor 110 may generate a MAC (a second MAC) for a previously stored authentication key and a data packet included in the response message using the HMAC SHA-256 algorithm. The processor 110 may determine whether the MAC generated by the authenticator 112 is identical to a MAC included in the response message. When the generated MAC is identical to the MAC included in the response message, the processor 110 may determine that the message authentication succeeds. When the generated MAC is not identical to the MAC included in the response message, the processor 110 may determine that the message authentication fails. When the message authentication fails, the processor 110 may discard the response message. Accordingly, by checking validity of the MAC included in the received response message, the processor 110 may detect forgery and falsification of data of a hacker by the validity check of the MAC, when the hacker attempts to perform forgery and falsification of read data.

Furthermore, the processor 110 may compare a random number stored in a nonce field 430 of the response message with a random number stored in a nonce field 430 of the read request message. The processor 110 may determine that the authentication of the response message succeeds, when the two random numbers are identical to each other, and may determine that the authentication of the response message fails, when the two random numbers are not identical to each other. When the message authentication fails by the comparison and verification of the random numbers, the processor 110 may discard the response message. By the comparison and verification of the random numbers, the processor 110 may prevent data from being played, when a hacker records or takes back up the response message and attempts to play data.

When the authentication of the response message is completed, in S190, the processor 110 may read data. When it is determined that the message authentication succeeds, the processor 110 may read data stored in a data field 420 of the response message.

Figure 6:
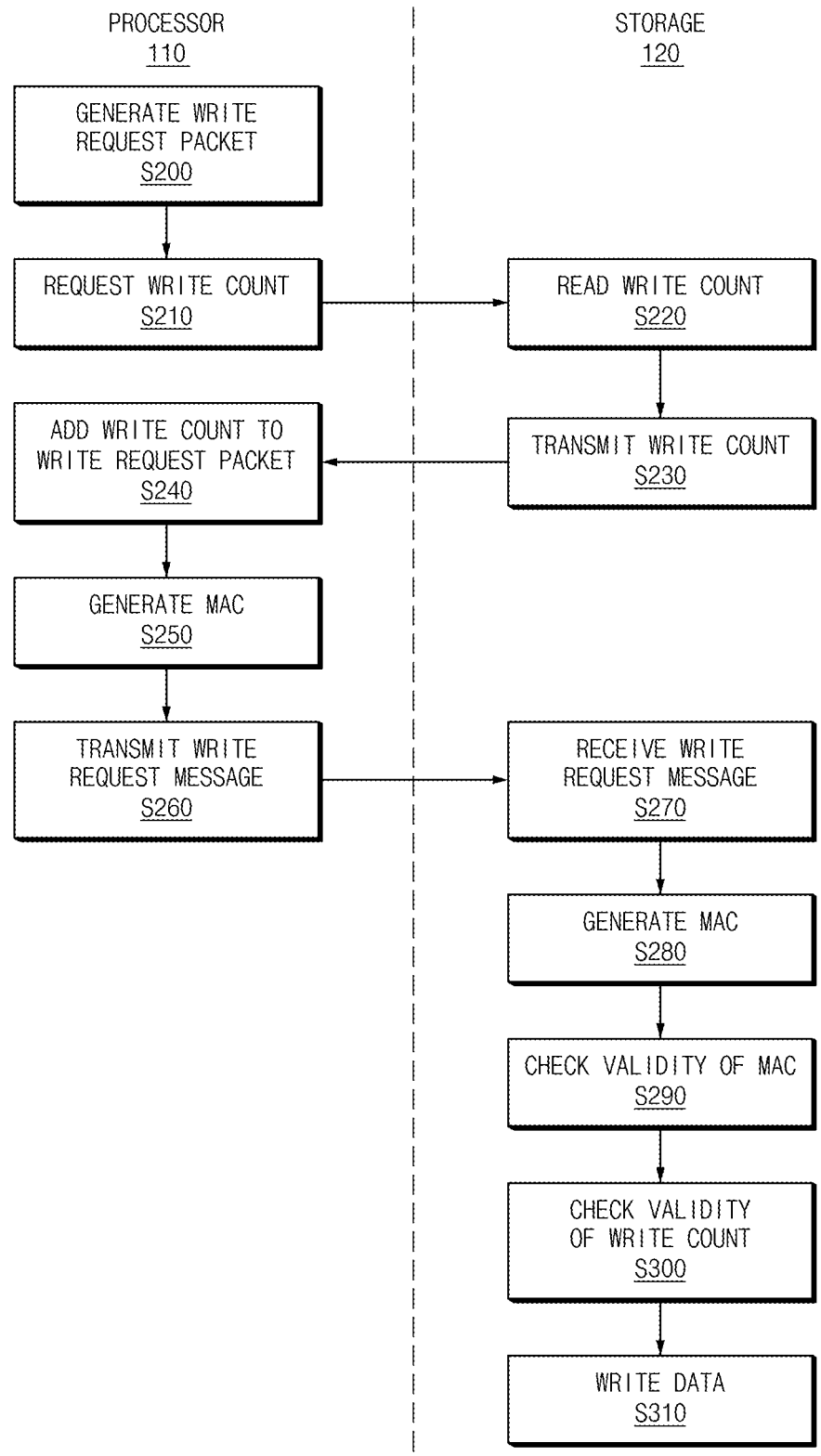
FIG. 6 is a signal sequence diagram illustrating a data write method of an autonomous driving recorder according to exemplary embodiments of the present invention.

FIG. 6 is a signal sequence diagram illustrating a data write method of an autonomous driving recorder according to exemplary embodiments of the present invention.

In S200, a processor 110 of FIG. 1 may generate a write request packet (a data packet), when it is required to write information related to a running state of a vehicle. When receiving a trigger signal from an autonomous driving controller 111 of FIG. 1, a data logger 113 of the processor 110 may generate the write request packet. The data logger 113 may collect and store information related to a running state of the vehicle (i.e., information associated with a generation event), when generating the trigger signal, in a data field 420 of the write request packet.

After generating the write request packet, in S210, the processor 110 may request a write count from a storage 120 of FIG. 1.

In S220, the storage 120 may read the write count. A controller 122 of the storage 120 may read a write count stored in a counter 211 in a secure world 210 of FIG. 2A.

In S230, the storage 120 may transmit the read write count to the processor 110.

In S240, the processor 110 may add the received write count to a counter field 440 of the write request field.

In S250, the processor 110 may generate a MAC (a third MAC) for a previously stored authentication key and the write request packet. An authenticator 112 of the processor 110 may determine the MAC, that is, a hash value, for the previously stored authentication key and the write request packet using an HMAC SHA-256 algorithm.

In S260, the processor 110 may transmit a write request message including the generated MAC to the storage 120. The data logger 113 may insert the generated MAC into a key field 410 of FIG. 3 and may generate a data frame including the key field 410 and the write request packet. The data logger 113 may transmit the generated data frame, that is, the write request message to the storage 120.

In S270, the storage 120 may receive the write request message transmitted from the processor 110.

In S280, the storage 120 may generate a MAC (a fourth MAC) for the write request packet included in the write request message. The controller 122 of the storage 120 may determine a hash value for the authentication key stored in the secure world 210 and the data packet in the received write request message, that is, the write request packet.

In S290, the storage 120 may check validity of the MAC included in the write request message. The controller 122 of the storage 120 may authenticate the write request message by MAC verification. The controller 122 may compare the generated MAC with the MAC included in the received write request message. The controller 122 may determine that the authentication succeeds (that the authentication is valid), when the generated MAC and the received MAC are identical to each other, and may determine that the authentication fails (that the authentication is invalid), when the generated MAC and the received MAC are not identical to each other.

In S300, the storage 120 may check validity of the write count included in the write request message. The controller 122 may determine whether a write count stored in a counter field 440 of the write request packet is identical to the write count read from a counter 211 in the secure world 210. The controller 122 may determine that the authentication succeeds (that the authentication is valid), when the two write counts are identical to each other, and may determine that the authentication fails (that the authentication is invalid), when the two write counts are not identical to each other.

When the authentication of the write request message is completed, in S310, the storage 120 may write data. When the authentication of the write request message succeeds by the MAC validity check and the write count validity check, the storage 120 may store information related to the running state of the vehicle, which is included in the write request message, in the secure world 210.

Figure 7:
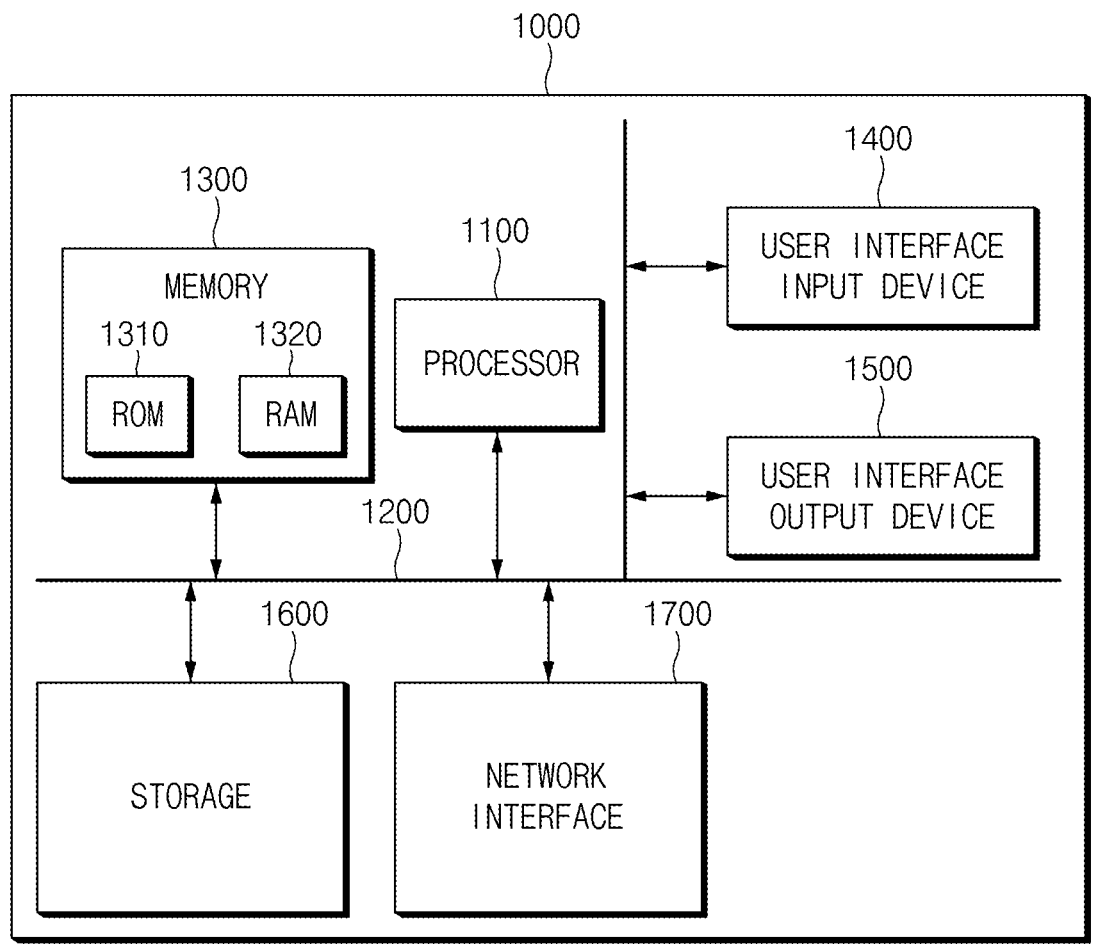
FIG. 7 is a block diagram illustrating a determining system for executing an operation method of an autonomous driving recorder according to exemplary embodiments of the present invention.

FIG. 7 is a block diagram illustrating a computing system for executing an operation method of an autonomous driving recorder according to exemplary embodiments of the present invention.

Referring to FIG. 7, a computing system 1000 may include at least one processor 1100, a memory 1300, a user interface input device 1400, a user interface output device 1500, storage 1600, and a network interface 1700, which are connected to each other via a bus 1200.

The processor 1100 may be a central processing unit (CPU) or a semiconductor device that processes instructions stored in the memory 1300 and/or the storage 1600. The memory 1300 and the storage 1600 may include various types of volatile or non-volatile storage media. For example, the memory 1300 may include a read only memory (ROM) 1310 and a random access memory (RAM) 1320.

Thus, the operations of the method or the algorithm described in connection with the exemplary embodiments included herein may be embodied directly in hardware or a software module executed by the processor 1100, or in a combination thereof. The software module may reside on a storage medium (that is, the memory 1300 and/or the storage 1600) such as a RAM, a flash memory, a ROM, an EPROM, an EEPROM, a register, a hard disk, a removable disk, and a CD-ROM. The exemplary storage medium may be coupled to the processor, and the processor may read information out of the storage medium and may record information in the storage medium. Alternatively, the storage medium may be integrated with the processor 1100. The processor 1100 and the storage medium may reside in an application specific integrated circuit (ASIC). The ASIC may reside within a user terminal. In another case, the processor 1100 and the storage medium may reside in the user terminal as separate components.

According to exemplary embodiments of the present invention, the autonomous driving recorder may securely store information related to a running state of the vehicle in the secure world during autonomous driving.

According to exemplary embodiments of the present invention, the autonomous driving recorder may perform an authentication procedure when accessing the secure world, thus improving security for data (information) stored in the secure world.

For convenience in explanation and accurate definition in the appended claims, the terms "upper", "lower", "inner", "outer", "up", "down", "upwards", "downwards", "front", "rear", "back", "inside", "outside", "inwardly", "outwardly", "interior", "exterior", "internal", "external", "forwards", and "backwards" are used to describe features of the exemplary embodiments with reference to the positions of such features as displayed in the figures. It will be further understood that the term "connect" or its derivatives refer both to direct and indirect connection.

The foregoing descriptions of specific exemplary embodiments of the present invention have been presented for purposes of illustration and description. They are not intended to be exhaustive or to limit the present invention to the precise forms disclosed, and obviously many modifications and variations are possible in light of the above teachings. The exemplary embodiments were chosen and described to explain certain principles of the present invention and their practical application, to enable others skilled in the art to make and utilize various exemplary embodiments of the present invention, as well as various alternatives and modifications thereof. It is intended that the scope of the present invention be defined by the Claims appended hereto and their equivalents.

What is claimed is:

1. An autonomous driving recorder comprising:
   a storage including a secure world;
   an authenticator configured to store an authentication key; and
   a data logger configured to write information related to a running state of a vehicle during autonomous driving of the vehicle,
   wherein the data logger is configured to access the secure world using the authentication key and to write data associated with a trigger signal among the information related to the running state in the secure world during autonomous driving of the vehicle,
   wherein the storage is configured to:
      receive a write request message transmitted from the data logger,
      compare a write count included in the received write request message with a write count read from a counter, and
      conclude that authentication of the received write request message succeeds, when the write count included in the received write request message and the write count read from the counter are identical to each other,
   wherein the data logger is configured to store the data for generation event in an internal memory, when the trigger signal is generated, and store a copy of the data in the storage, when the vehicle stops or parks,
   wherein the data logger is configured to generate a read request packet when detecting a read request, to generate a random number and to add the random number to the read request packet, and to transmit a read request message including the read request packet to the storage, wherein the storage including a controller is configured to check validity of an address included in the received read request message, when receiving the read request message, to generate a first message authentication code (MAC) for an authentication key stored in the secure world and the read request packet included in the received read request message, and to generate a response message including the first MAC, a copy of the random number, data matched to the address and to transmit the response message to the data logger, and wherein the data logger is configured to generate a second MAC for the authentication key stored in the authenticator and a read request packet included in the received response message, when receiving the response message, to compare the first MAC with the second MAC and to conclude that authentication of the received response message succeeds, when the first and second MACs are identical to each other, and to read the data included in the response message.

2. The autonomous driving recorder of claim 1, wherein the storage is a non-volatile memory.

3. The autonomous driving recorder of claim 1,
wherein the trigger signal is a signal indicating at least one of autonomous driving system activation, autonomous driving system deactivation, a transition demand (TD) by a system, an emergency maneuver, an event data recorder (EDR) trigger, collision start and end, a minimum risk maneuver (MRM) by the system, a system failure, or a vehicle breakdown.

4. The autonomous driving recorder of claim 1,
wherein the data logger is configured to generate a write request packet including data associated with the trigger signal, when receiving the trigger signal, reads a write count stored in the counter in the secure world and adds a read write count to the write request packet, generates a third MAC for the authentication key stored in the authenticator and the write request packet, and generates the write request message including the third MAC and the read request packet and transmits the write request message to the storage.

5. The autonomous driving recorder of claim 4,
wherein the storage generates a fourth MAC for an authentication key stored in the secure world and the write request packet included in the received write request message, and compares the third MAC with the fourth MAC and concludes that authentication of the received write request message succeeds, upon determining that the third and fourth MACs are identical to each other.

6. The autonomous driving recorder of claim 5,
wherein the storage writes the data associated with the trigger signal in the secure world, upon determining that the authentication of the received write request message succeeds.

7. The autonomous driving recorder of claim 5,
wherein the storage is configured to discard the received write request message, when the authentication of the received write request message fails.

8. An operation method of an autonomous driving recorder for writing information related to a running state of a vehicle during autonomous driving of the vehicle, the operation method comprising:
requesting, by a data logger, to access a secure world in a storage;
accessing, by the data logger, the secure world using an authentication key stored in an authenticator; and
writing, by the data logger, data associated with a trigger signal among the information related to the running state in the secure world during autonomous driving of the vehicle,
wherein the writing of the data associated with the trigger signal includes:
receiving, by the storage, a write request message transmitted from the data logger;
comparing, by the storage, a write count included in the received write request message with a write count read from a counter; and
concluding, by the storage, that authentication of the received write request message succeeds, upon determining that the write count included in the received write request message and the write count read from the counter are identical to each other, and
wherein the writing of the data associated with the trigger signal further includes:
storing, by the data logger, the data for generation event in an internal memory, when the trigger signal is generated; and
storing, by the data logger, a copy of the data in the storage, when the vehicle stops or parks,
wherein the requesting to access the secure world includes:
generating, by the data logger, a read request packet, when detecting a read request;
generating, by the data logger, a random number and adding, by the data logger, the random number to the read request packet; and
transmitting, by the data logger, a read request message including the read request packet to the storage,
wherein the operation method further includes:
checking, by the storage including a controller, validity of an address included in the received read request message, when receiving the read request message;
generating, by the storage, a first message authentication code (MAC) for an authentication key stored in the secure world and the read request packet included in the received read request message;
generating, by the storage, a response message including the first MAC, a copy of the random number, data matched to the address and transmitting, by the storage, the response message to the data logger;
generating, by the data logger, a second MAC for the authentication key stored in the authenticator and a read request packet included in the received response message, when receiving the response message;
comparing, by the data logger, the first MAC with the second MAC and concluding, by the data logger, that authentication of the received response message succeeds, upon determining that the first and second MACs are identical to each other; and
reading, by the data logger, the data included in the response message.

9. The operation method of claim 8, wherein the requesting to access the secure world includes:
generating, by the data logger, a write request packet including the data associated with the trigger signal, when receiving the trigger signal;
reading, by the data logger, a write count stored in the counter in the secure world and adding, by the data logger, a read write count to the write request packet;
generating, by the data logger, a third MAC for the authentication key stored in the authenticator and the write request packet; and generating, by the data logger, the write request message including the third MAC and the write request packet and transmitting, by the data logger, the write request message to the storage.

10. The operation method of claim 9, wherein the writing of the data associated with the trigger signal includes:

generating, by the storage, a fourth MAC for an authentication key stored in the secure world and the write request packet included in the received write request message; and comparing, by the storage, the third MAC with the fourth MAC and concluding, by the storage, that authentication of the received write request message succeeds, upon determining that the third and fourth MACs are identical to each other.

11. The operation method of claim 10, wherein the writing of the data associated with the trigger signal further includes:

writing, by the storage, the data associated with the trigger signal in the secure world, upon determining that the authentication of the received write request message succeeds.

12. The operation method of claim 10, wherein the writing of the data associated with the trigger signal further includes:

discarding, by the storage, the received write request message, upon determining that the authentication of the received write request message fails.

\* \* \* \* \*

UNITED STATES PATENT AND TRADEMARK OFFICE
CERTIFICATE OF CORRECTION

| | | |
|---|---|---|
| PATENT NO. | : 12,340,639 B2 | Page 1 of 1 |
| APPLICATION NO. | : 17/389817 | |
| DATED | : June 24, 2025 | |
| INVENTOR(S) | : Byung Guk Kim et al. | |

It is certified that error appears in the above-identified patent and that said Letters Patent is hereby corrected as shown below:

On the Title Page

Column 1, after Item (65), please add the following information:
-- (30) Foreign Application Priority Data
June 24, 2025 (KR) .......................... 10-2020-0186222 --

Signed and Sealed this
Twenty-eighth Day of October, 2025

John A. Squires
*Director of the United States Patent and Trademark Office*